United States Patent [19]

Ingraham et al.

[11] Patent Number: 4,542,714
[45] Date of Patent: Sep. 24, 1985

[54] BIRD EXERCISER AND AMUSEMENT TOY DEVICE

[76] Inventors: John T. Ingraham; Gary A. Mortimer, both of 2504 N. Lincoln, Burbank, Calif. 91506

[21] Appl. No.: 637,585

[22] Filed: Aug. 3, 1984

[51] Int. Cl.[4] .............................................. A01K 31/12
[52] U.S. Cl. ......................................... 119/29; 119/26
[58] Field of Search .............................. 119/29, 26, 18

[56] References Cited

U.S. PATENT DOCUMENTS

| | | | |
|---|---|---|---|
| 1,791,175 | 2/1931 | Tomlinson | 119/18 |
| 2,487,087 | 11/1949 | Anderson | 119/26 |
| 2,707,937 | 5/1955 | Herman | 119/29 |
| 2,800,105 | 7/1957 | Ilg | 119/29 |
| 2,808,807 | 10/1957 | Winton et al. | 119/29 X |

Primary Examiner—Hugh R. Chamblee
Attorney, Agent, or Firm—John J. Posta, Jr.

[57] ABSTRACT

The improved bird exerciser and amusement toy device comprises a vertical length of flexible multi-link chain, a hook with universal joint secured to the upper end of the chain to releasably hang the chain in a bird cage, a plurality of colored bird attractive beads slideably disposed on and secured to the links for individual sliding movement therearound by a bird, and at least one of a bell, a sitting ring and a chew toy, preferably of rawhide secured to the lower end of the chains. The beads may be of any suitable size, color, texture and shape. In one embodiment, certain of the beads are covered and/or filled with edible seeds, etc. In another embodiment, one or more of the beads are large and freely slide up and down a small multi-link section of the chain. Certain of the links may also extend horizontally or diagonally from the chain. The chain can include a spring section, and/or a multi-rod abacus section and/or a multi-loop scroll section. The chew toy may be oriented to act as a bell or gong clapper. The device is simple, durable and attractive. It affords birds safe exercise and amusement.

3 Claims, 6 Drawing Figures

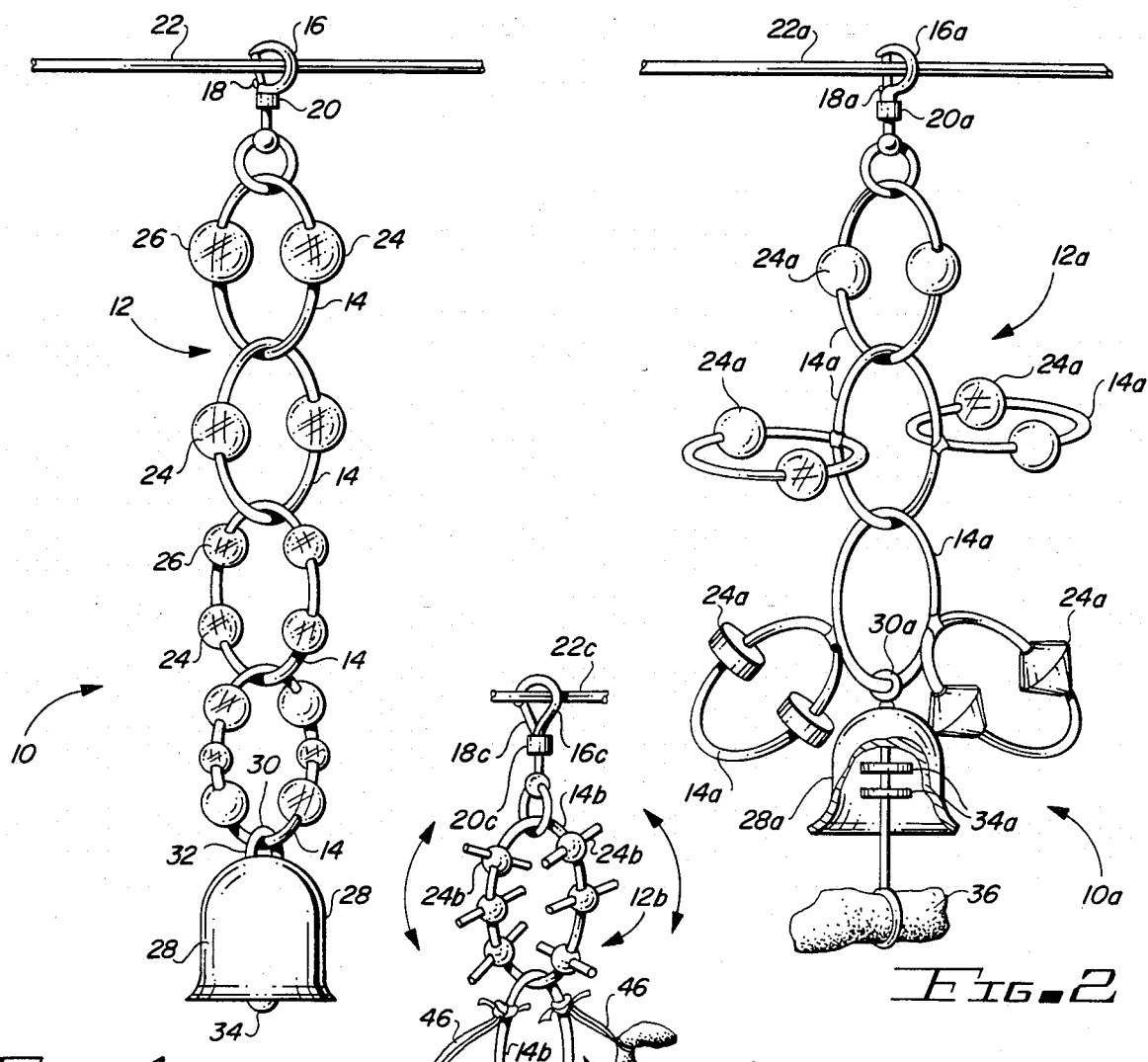
Fig-1
Fig-2
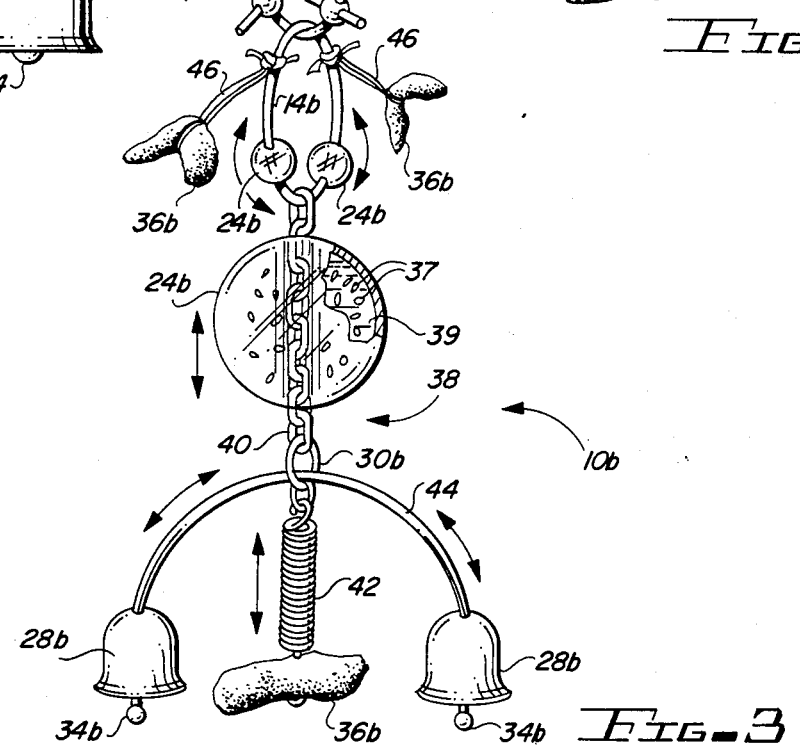
Fig-3

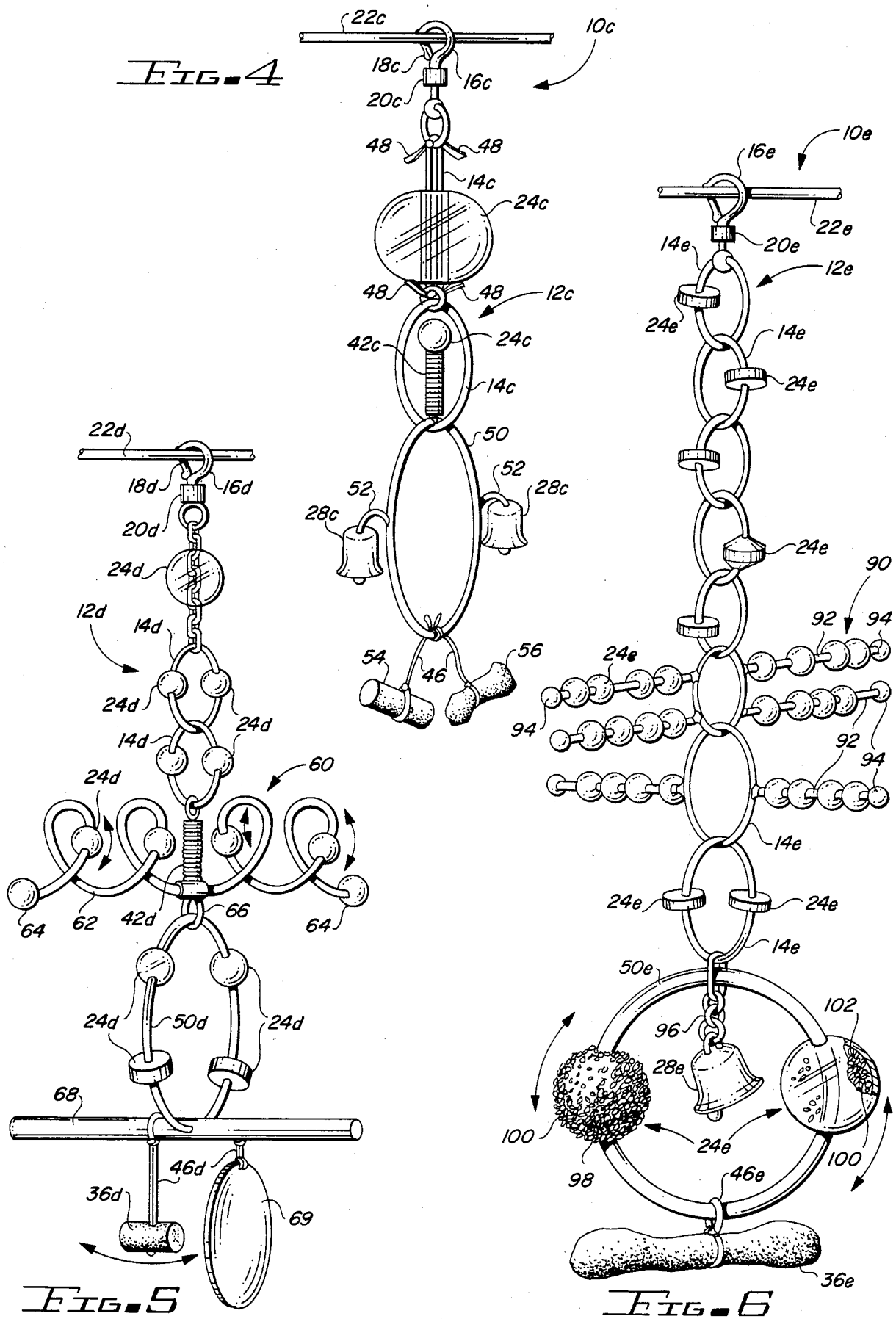

4,542,714

BIRD EXERCISER AND AMUSEMENT TOY DEVICE

BACKGROUND OF THE INVENTION

1. Field of the Invention

The present invention generally relates to bird accessories and, more particularly, to an improved bird exerciser and amusement toy device.

2. Prior Art

Strong, safe exercisers and amusement toys for active intelligent birds such as those of the parrot type, including parakeets, macaws and parrots, are necessary equipment for an owner, but are surprisingly difficult to find on the commercial market. Few have been constructed with any thought to the birds real needs. Most bird exercisers and toys unfortunately are flimsy and not very attractive to the birds, so that they are easily destroyed and/or seldom used by the birds. Parrot-type birds have strong beaks and necks and enjoy biting. That need must be satisfied. Bird devices such as are disclosed in, for example, U.S. Pat. Nos. 2,707,937, 2,718,209, 2,808,807, and 2,707,936, are also flimsy and/or afford the bird little or no useful biting exercise.

Accordingly, there remains a need for a safe, sturdy type of bird exerciser which will keep attracting the bird over a long period of time and will provide the bird with needed amusement, interest and exercise, so that the bird stays fit and happy. The device should be capable of being provided in a variety of forms, sizes and shapes to suit individual preferences and should be durable and inexpensive.

SUMMARY OF THE INVENTION

The improved bird exerciser and amusement toy device of the present invention satisfies all the foregoing needs. The device is substantially as set forth in the Abstract above. Thus, the device comprises a sturdy, large linked flexible chain adapted to be hung vertically by a hook with universal joint from a wire in a bird cage. Most of the closed hoop-like chain links each include one or more brightly colored beads slideably disposed on the link and moveable along the individual link by the bird for amusement and exercise. The device also includes a rawhide chew toy and/or bell and/or sitting ring at the lower end thereof to provide additional chewing exercise and/or amusement.

The beads may be of any desired bright colors, size, shape and texture. Certain of the beads may be covered with and/or fitted with seeds or the like. In one embodiment, large transparent beads freely slide up and down a multiple small link section for extra exercise. Certain of the links may extend horizontally or diagonally from the chain slides.

The chain can also contain a resilient spring section to provide vertical oscillation, and/or a multiple horizontal rod abacus section containing a plurality of slide beads on each rod, as an amusement, exercise and teaching aid and/or a multi-loop scroll section. The chew toy can be oriented next to or between one or more bells, gongs, etc. so that chewing on the toy can cause it to oscillate and act as a clapper. Various other arrangements of components are possible. The device is safe, durable and effective to exercise and amuse birds. Further features of the present invention are set forth in the following detailed description and accompanying drawings.

DRAWINGS

FIG. 1 is a schematic front elevation of a first preferred embodiment of the improved bird exerciser and amusement toy device of the present invention;

FIG. 2 is a schematic front elevation, partly broken away, of a second preferred embodiment of the improved device of the present invention;

FIG. 3 is a schematic front elevation of a third preferred embodiment of the improved device of the present invention;

FIG. 4 is a schematic front elevation of a fourth preferred embodiment of the improved device of the present invention;

FIG. 5 is a schematic front elevation of a fifth preferred embodiment of the improved device of the present invention; and, FIG. 6 is a schematic front elevation of a sixth preferred embodiment of the improved device of the present invention.

DETAILED DESCRIPTION

FIG. 1

Now referring more particularly to FIG. 1 of the accompanying drawings, a first preferred embodiment of the bird exerciser and amusement toy device of the invention is schematically depicted therein. Thus, device 10 is shown which comprises a flexible chain 12 formed by a plurality of large, hoop-like, closed, interconnected links 14, which may be of various sizes and shapes, for example, oval, as shown. Chain 12 includes a hook 16 with spring tongue 18 at the upper end 17 of chain 12 connected thereto by a universal joint swivel fitting 20. Hook 16 is shown releasably secured to bird cage wire 22 so that chain 12 depends therefrom, for example, in a parrot cage or the like.

Links 14 are shown in FIG. 1 as endless closed hoops of steel, copper, aluminum or looped over one another. Links 14 preferably are of heavy gauge steel. Each link can be welded or soldered closed over the preceding link to form chain 12. On each link 14 are slideably disposed two or more brightly colored beads 24. Beads 24 preferably are of durable plastic and cannot be removed from the associated link 14, although they slide freely or with some difficulty thereon to provide the bird exercise and amusement. Beads 24 are shown in FIG. 1 to be transparent and round with central slide holes 26. However, beads 24 could be oval, flat and disc-shaped, rectangular, square, etc. They could be opaque, or translucent and of more than one color, if desired. They could be made of metal, ceramic, hard wood or other durable unbreakable material. Beads 24 are added to each link 14 before the link is closed.

A bell 28 of metal, ceramic, or the like is connected to the lower end 30 of chain 12 by ring 32 and depends therefrom, so that bell 28 is sounded by clapper 34 thereof during appreciable movement of chain 12 by a bird.

The selection of the length, size and guage of metal for links 14, and the material, size and shape of beads 24 and bell 28 will depend on the particular type of bird which will use device 10. Device 10 is made strong enough to prevent breakage of its components. Beads 24 assure that the bird will amuse and exercise itself at length when chain 12 is fixed in its cage.

FIG. 2

A second preferred embodiment of the improved bird exerciser and amusement toy device of the invention is shown in FIG. 2. Thus, device 10a is shown. Components thereof similar to those of device 10 bear the same numerals, but are succeeded by the letter "a". Thus, device 10a includes chain 12a formed by links 14a, hook 16a with tongue 18a and universal joint 20a for hanging from wire 22a. Links 14a include beads 24a slideably disposed thereon.

Chain 12a also includes bell 28a having an internal clapper 34a and an external preferably rawhide chew toy 36 depending therefrom, so that chewing on toy 36 causes clapper 34a to ring bell 28a. It will be noted that certain of links 14a are welded or soldered to and extend horizontally from the sides of chain 12a and other of links 14a are welded or soldered to and extend downwardly diagonally from chain 12a. Moreover, certain of beads 24a are circular, others are diamond shaped and still others are rectangular to provide device 10a with a variety of bead shapes to amuse and exercise a bird. Device 10a has substantially the advantages of device 10.

FIG. 3

A third preferred embodiment of the improved device of the invention is shown in FIG. 3. Thus, device 10b is shown. Components thereof similar to those of device 10 or 10a bear the same numerals, but are succeeded by the letter "b". Device 10b comprises chain 12b formed of large, closed hoop-like links 14b and also a lower section 38 comprising small links 40. Chain 12b is releasably secured to bird cage wire 22b by hook 16b and tongue 18b and universal joint 20b. Links 14b each include a plurality of beads 24b, some of which are spherical, and others of which are wing shaped. A large transparent spherical bead 24b is freely vertically slideably disposed over section 38 and may include seeds 37 in a suspending fluid 39. From the lower end 30b of chain 12b depends chew toy 36b by a spring 42 between two bells 28b disposed on opposite ends of an open flexible wire arch 44, so that lateral movement of toy 36b during chewing will cause movement in bells 28b and ringing thereof. Device 10b may also have a pair of chew toys 36b suspended by thick tethers 46 from opposite sides of a link 14b. Accordingly, device 10b has a number of moveable and/or chewable components and thus has the advantages of devices 10 and 10a.

FIG. 4

A fourth preferred embodiment of the present invention is shown in FIG. 4. Thus, device 10c is depicted. Components thereof similar to those of any of devices 10, 10a and 10b bear the same numerals, but are succeeded by the letter "c". Device 10c comprises chain 12c, links 14c, and hook 16c with tongue 18c and joint 20c for suspension of chain 12c from wire 22c. Links 14c each include a single bead 24c. One such bead 24c is large, transparent and moveable between stop guides 48 connected to the top and bottom of the associated link 14c. The other bead 24c is suspended in a link 14c by a thick spring 42c connected to that link 14c. A pair of bells 28c are secured to opposite side of a large bird seat ring 50 by flexible rods 52. Ring 50 is secured to the bottom link 14c and has chew blocks 54 and 56 of different shapes secured thereto by tether 46c. Device 10c has substantially the advantages of devices 10, 10a and 10b.

FIG. 5

A fifth version of the improved present device is depicted in FIG. 5. Thus, device 10d is shown. Components thereof which are similar to those of any of devices 10, 10a, 10b or 10c bear the same numerals, but are succeeded by the letter "d". Thus, device 10d includes chain 12d comprising links 14d and tongueless hool 16d and swivel 20d connecting chain 12d to wire 22d.

Chain 12d also includes beads 24d slideably disposed on links 14d, and a spring 42d secured to links 14d and to a fitting 58 bearing a horizontal section 60 in the configuration of a single multi-looped scroll 62 (FIG. 5). Scroll 62 includes end stops 64 and beads 24d slideably disposed thereof. Fitting 58 is connected by a loop 66 to a large, closed, depending bird seat ring 50d around which are slideably disposed certain of beads 24d. Ring 50b bears horizontal rod 68 from which depend by flexible tethers 46d a chew toy 36d and a gong 69 ringable by toy 36d. The sliding and chewable components of device 10d provide device 10d with the desired previous described advantages.

FIG. 6

A sixth preferred embodiment of the present improved device is schematically depicted in FIG. 6. Thus, device 10c is shown. Components thereof similar to those of any of devices 10, 10a, 10b, 10c or 10d bear the same numerals, but are succeeded by the letter "e". Device 10e includes chain 12e formed by openable links 14e looped and clamped shut and bearing slideable disc-shaped beads 24e. Hook 16e and joint 20e releasably secure chain 12e to bird cage wire 22e. Chain 12e includes an "abacus" section 90 having three sets of vertically spaced, parallel, horizontal rods 92 rigidly secured, as by welding or soldering, to the sides of the associated links 14e. Rods 92 have enlarged stops 94 at the exposed ends thereof and slideable oval counting beads 14e disposed thereon. The beads 24e of each pair of rods can be different in shape and/or color from those of the other pairs of rods, for an attractive effect and to provide an exercise, amusement and teaching aid for the bird. Those links 14e which bear rods 92 can, if desired, be soldered or welded together for greater rigidity.

The lower end 30e of chain 12e bears large sitting ring 50e from which depends bell 28e by a chain 96 and, below bell 28e, a chew toy 36e by a tether 46e. Ring 50e also slideably bears two large beads 24e, one of which may include a roughened exterior coating 98 of seeds 100, while the other is transparent and may include a hollow interior 102 filled with seeds 100. Device 10e has the advantages of devices 10, 10a, 10b, 10c and 10d.

Various other modifications, changes, alterations and additions can be made in the improved bird exerciser and amusement toy device of the present invention, its components and their parameters. All such modifications, changes, alterations and additions as are within the scope of the present claims form part of the present invention.

What is claimed is:

1. An improved bird exerciser and amusement toy device, said device comprising, in combination:
    (a) a length of flexible chain comprising a plurality of closed, interconnected hoop-like links;
    (b) hook means connected to the upper end of said chain and adapted to releasably secure said chain in a vertical orientation to wire of a bird case;
    (c) a plurality of colored, bird attractive, non-removable beads slideably disposed on at least certain of said links and individually moveable thereon by a bird for its exercise and amusement; and,
    (d) at least one of a sitting ring, a bell and a chew toy secured to said chain adjacent the lower end thereof, (e) wherein said beads are at least one of oval, round, disc-shaped, rectangular shaped and square shaped in configuration, (f) wherein said lower end of said chain includes a sitting ring over which certain of said beads are slideably disposed for movement therealong, (g) wherein said device includes at least one large bead containing bird seed disposed on at least one of the outer surface and the interior thereof, (h) wherein said ring includes a chew toy depending therefrom, said toy comprising rawhide, and (i) wherein said ring includes a gong depending therefrom in proximity to said chew toy, whereby lateral swinging of said chew toy can ring said gong.

2. The improved device of claim 1 wherein said ring includes said bell suspended therefrom.

3. The improved device of claim 2 wherein said chain includes a resilient spring section to facilitate vertical oscillation thereof.

* * * * *